United States Patent
Francalanci

(10) Patent No.: US 11,313,053 B2
(45) Date of Patent: Apr. 26, 2022

(54) OPTIMIZED PROCESS FOR THE PREPARATION OF A SPINNING SOLUTION FOR THE PRODUCTION OF ACRYLIC FIBERS PRECURSORS OF CARBON FIBERS AND THE RELATIVE CARBON FIBERS

(71) Applicant: Montefibre Mae Technologies S.r.l., Milan (IT)

(72) Inventor: Franco Francalanci, Uzzano (IT)

(73) Assignee: Montefibre Mae Technologies S.r.l., Milan (IT)

( * ) Notice: Subject to any disclaimer, the term of this patent is extended or adjusted under 35 U.S.C. 154(b) by 0 days.

(21) Appl. No.: 16/988,843

(22) Filed: Aug. 10, 2020

(65) Prior Publication Data

US 2021/0054539 A1    Feb. 25, 2021

(30) Foreign Application Priority Data

Aug. 20, 2019  (IT) .................. 102019000014880

(51) Int. Cl.
| | | |
|---|---|---|
| *C08F 20/44* | (2006.01) | |
| *C08F 220/46* | (2006.01) | |
| *C08F 220/48* | (2006.01) | |
| *C08F 236/12* | (2006.01) | |
| *C08J 3/11* | (2006.01) | |
| *C08K 5/17* | (2006.01) | |
| *C08L 33/20* | (2006.01) | |
| *D01D 1/02* | (2006.01) | |
| *D01D 5/06* | (2006.01) | |
| *D01D 10/02* | (2006.01) | |
| *D01F 1/07* | (2006.01) | |
| *D01F 6/38* | (2006.01) | |
| *D01F 9/22* | (2006.01) | |
| *C08J 3/09* | (2006.01) | |

(52) U.S. Cl.
CPC ................. *D01F 9/22* (2013.01); *C08J 3/097* (2013.01); *D01F 9/225* (2013.01); *D10B 2101/12* (2013.01)

(58) Field of Classification Search
CPC ...... C08F 20/44; C08F 220/46; C08F 220/48; C08F 236/12; C08J 3/097; C08J 3/11; C08K 5/17; C08L 33/20; D01D 1/02; D01D 5/04; D01D 5/06; D01D 10/02; D01F 1/07; D01F 6/38; D01F 9/22; D01F 9/225

USPC ..... 264/29.2, 29.6, 182, 184, 205, 206, 211, 264/331.16, 331.18; 423/447.8; 524/251, 524/565; 525/540

See application file for complete search history.

(56) References Cited

U.S. PATENT DOCUMENTS

| | | | |
|---|---|---|---|
| 3,923,950 A * | 12/1975 | Gump | ..................... D01F 9/225 264/182 |
| 4,378,343 A * | 3/1983 | Sugiura | ..................... D01F 9/22 264/29.2 |
| 5,804,108 A | 9/1998 | Wilkinson | |
| 6,054,214 A | 4/2000 | Wilkinson | |
| 8,137,810 B2 | 3/2012 | Ise et al. | |
| 8,674,045 B2 | 3/2014 | Tanaka et al. | |
| 9,296,889 B2 | 3/2016 | Francalanci et al. | |
| 2006/0134413 A1 | 6/2006 | Wilkinson | |
| 2009/0224420 A1 | 9/2009 | Wilkinson | |
| 2010/0278716 A1 * | 11/2010 | Sudo | ......... D01F 9/22 524/565 X |
| 2015/0376391 A1 * | 12/2015 | Francalanci | ............. D01D 5/06 524/173 |

FOREIGN PATENT DOCUMENTS

| | | |
|---|---|---|
| CN | 104231158 A | 12/2014 |
| CN | 106591994 A | 4/2017 |
| EP | 1921183 A1 | 5/2008 |
| EP | 2894243 A1 | 7/2015 |
| JP | H1112856 A | 1/1999 |
| WO | 96/02578 A1 | 2/1996 |

OTHER PUBLICATIONS

Fiocco, Marco, "Search Report and Written Opinion for Italian Application No. 102019000014880," Italian Patent Office, dated Apr. 16, 2020.

* cited by examiner

*Primary Examiner* — Leo B Tentoni
(74) *Attorney, Agent, or Firm* — Florek & Endres PLLC

(57) ABSTRACT

An optimized process for the preparation of a spinning solution for the production of acrylic fiber precursors (PAN) of carbon fibers and an optimized process for the production of carbon fibers from said acrylic precursor (PAN), are described.

12 Claims, No Drawings

OPTIMIZED PROCESS FOR THE PREPARATION OF A SPINNING SOLUTION FOR THE PRODUCTION OF ACRYLIC FIBERS PRECURSORS OF CARBON FIBERS AND THE RELATIVE CARBON FIBERS

The present invention relates to an optimized process for the preparation of a spinning solution for the production of acrylic fiber precursors (PAN) of carbon fibers, and an optimized process for the production of carbon fibers from said acrylic precursor (PAN).

More specifically, the present invention falls within the sector relating to the production of carbon fibers, whose preparation process has been known for many years and which, in most cases, is based on the heat treatment of a suitable acrylic precursor (PAN), having a chemical composition suitable for allowing a controlled gradual elimination of heteroatoms.

This gradual elimination of heteroatoms is obtained thanks to the presence in the polymer chain of the precursor of specific co-monomers having groups which allow the heat developed during the oxidation/stabilization treatment to be distributed in relatively long times, avoiding sudden exothermic peaks which, in addition to providing low-quality carbon fibers, creates exposure to risks of uncontrolled combustion during the heating phase. The co-monomers most commonly used for this purpose are vinyl, mono or dicarboxylic acids. In particular, acrylic acid, methacrylic acid or itaconic acid are used in quantities generally ranging from 0.5 to 5% by weight with respect to the total weight of the monomers fed to the polymerization reactor. The other reagents are mainly acrylonitrile (95-99.5% by weight) and, optionally, a third component generally chosen from methyl acrylate, vinyl acetate and acrylamide (0-3.0% by weight).

PAN precursors can be prepared by means of different processes starting from the co-monomers selected. The state of the art can be divided and schematized as follows:

A. Discontinuous Processes (Two-Step)

In two-step discontinuous processes, the polymer is generally produced in an aqueous suspension, isolated and subsequently dissolved in a suitable solvent to be spun and transformed into a fiber precursor of carbon fiber. The solvents most commonly used for the preparation of the spinning solution are: dimethylacetamide (DMAC), dimethylformamide (DMF), an aqueous solution of sodium thiocyanate (NaSCN).

B. Continuous Processes (One-Step)

In continuous processes, however, the polymerization takes place in a solvent and the solution thus obtained is directly used in spinning without the intermediate isolation of the polymer. The solvents most commonly used in these processes are: dimethylformamide (DMF), dimethylsulfoxide (DMSO), aqueous solution of zinc chloride ($ZnCl_2$) and aqueous solution of sodium thiocyanate (NaSCN).

By means of these processes, well-known to persons skilled in the art, various types of carbon fiber with standard characteristics of toughness and elastic modulus can be easily obtained. Some modifications to these methods have been proposed, however, in order to improve the performance of the fibers produced.

One of the most significant changes relates to the use of nitrogen compounds in the production process of the PAN precursor, in particular the use of primary and secondary low-molecular-weight amines and, above all, ammonia.

In particular, patents U.S. Pat. Nos. 5,804,108, 6,054,214 and patent application US 2009/0224420 A1 describe a method for increasing the elastic modulus of the carbon fibers produced up to 2.5 times.

In this process, the PAN precursor containing itaconic acid is treated with amines or ammonia during the spinning phase. In particular, the PAN fiber, immediately after the coagulation phase at the outlet of the spinneret, is treated in an aqueous bath containing amines or ammonia and, after completion of the spinning, the fiber is subsequently treated at temperatures ranging from 240° C. to 260° C. for 12-15 minutes, before being carbonized.

A reaction mechanism is assumed wherein the itaconic acid is salified with amines or ammonia. These ammonium salts after heat treatment turn into amides and eventually cause the cross-linking of the PAN fiber by attacking the nitrile groups present in the polymer chain.

It is particularly important that the salification process of the carboxylic groups with ammonia or amines take place homogeneously, affecting all of the polymer that composes the fiber and not only the carboxylic groups present on the outer surface of the same, more directly exposed to contact with the ammonia or with the amines dissolved in water. This partial salification, limited to the most superficial part of the fiber, would in fact cause a different behaviour to the heat treatment of the outer surface of the fiber with respect to the internal parts of the PAN precursor obtaining a carbon fiber having an unsatisfactory quality. In order to ensure the necessary homogeneity in the salification of all the carboxylic groups, the treatment with ammonia or with amines must therefore take place under suitable stretching and relaxation conditions which allow the penetration of the ammonia or amines also within the fibrous structure.

In other patents, such as JPH1112856A, U.S. Pat. Nos. 8,137,810 and 8,674,045, the use of gaseous ammonia directly in the spinning solution (dope), is claimed. In these cases the use of ammonia is mainly motivated by the neutralization of the acid groups carried by the co-monomers used (mainly itaconic acid and acrylic acid). Salification of the acid groups with ammonia to give ammonium carboxylates allows an improved production process of the PAN precursor, facilitating the coagulation phase thanks to the greater hydrophilic nature of the polymer chain after salification of the acid end groups and their transformation into ammonium salts.

This neutralization method guarantees the homogeneity of the treatment as the polymer is dissolved in the solvent and therefore there are no areas with a different reactivity, as happens, on the contrary, when operating in heterogeneous phase with a solid (PAN fiber) immersed in an aqueous solution of ammonia or amines.

Regardless of the mechanism involved, the use of ammonia or primary or secondary amines contributes to the production of higher-quality carbon fibers compared to those obtainable in the absence of ammonia or amines. A further advantage lies in the reduction of the heat treatment times necessary for reaching a fiber density of at least 1.35-1.43 g/cc, said density being necessary for feeding the oxidized product (PANOX) to the carbonization furnaces. This reduction in the stabilization time entails considerable advantages both in terms of energy consumption and in terms of investment in the construction of the stabilization ovens.

In any case, the processes described above necessarily provide for an additional step in the production process of the PAN precursor.

In US 2009/0224420 A1, a step must be added for the addition of an amine or ammonia in a stretching condition, followed by a relaxation phase and subsequently a new stretching phase at higher temperatures. U.S. Pat. Nos. 8,137,810 and 8,674,045 provide for the use of a dangerous reagent which is difficult to manage such as gaseous ammonia which is characterized as a toxic gas.

In EP 2,894,243 (U.S. Pat. No. 9,296,889), on the other hand, a process is described for the preparation of acrylic fibers or carbon fiber precursors wherein an acrylic polymer containing itaconic acid or acrylic acid is dissolved, under particular conditions, specifically in a DMSO/water mixture in a ratio which ranges from 94.5/5.5 to 97/3% w/w-.

The objective of the present invention is therefore to provide an optimized process for the preparation of a spinning solution for the production of acrylic fiber precursors (PAN) of carbon fiber and, in particular, an optimized process for the production of carbon fibers from said acrylic precursor (PAN) which overcomes the drawbacks of the processes of the state of the art, reducing production costs, and above all allowing carbon fibers with particularly high tenacity and elastic modulus characteristics, to be obtained.

DETAILED DESCRIPTION OF THE INVENTION

The present invention therefore relates to a process for preparing a homogeneous spinning solution for the production of acrylic fiber precursors (PAN) of carbon fibers which comprises the following steps:

i) preparation of a homogeneous suspension by mixing a copolymer of the acrylonitrile in powder form with a solvent consisting of a mixture containing DMSO in a quantity ranging from 90 to 99% by weight and an aqueous solution of ammonia and/or one or more primary amines and/or one or more secondary amines, in a quantity ranging from 1 to 10% by weight with respect to the total weight of the solvent, at a temperature ranging from 5° C. to 10° C., preferably with a solvent consisting of a mixture containing DMSO in a quantity ranging from 93 to 98%, preferably from 93 to 96%, by weight and an aqueous solution of ammonia or primary or secondary amines in a quantity ranging from 2 to 7%, preferably from 4 to 7%, by weight with respect to the total weight of the solvent, at a temperature of 5° C., said mixing being carried out in a time ranging from 5 to 30 minutes, by spraying a stream of the DMSO solvent/aqueous solution of ammonia or a primary or secondary amine onto a stream of the disaggregated and pre-mixed acrylonitrile copolymer powder;

ii) heating the homogeneous suspension coming from step i) to a temperature ranging from 70 to 150° C. in a time ranging from 0.5 to 30 minutes, until the complete dissolution of the copolymer and the formation of a homogeneous solution.

The aqueous solution of ammonia or of a primary amine or a secondary amine comprises from 1 to 10% by weight of the nitrogenous substance, preferably from 2 to 7% by weight, with respect to the total weight of the solution.

The aqueous solution is preferably an aqueous solution of ammonia or of a primary amine or a secondary amine.

The solvent preferably consists of a mixture containing DMSO and an aqueous ammonia solution.

In the aqueous solution of a primary and/or secondary amine, the primary amine is selected from methylamine, ethylamine and isopropylamine, preferably methylamine and/or the secondary amine is selected from dimethylamine, diethylamine and diisopropylamine, preferably dimethylamine.

The polymer to be used in the process object of the present invention is a high-molecular-weight copolymer, which ranges from 100,000-300,000 Da, mainly composed of acrylonitrile, in a quantity ranging from 90 to 99% by weight with respect to the total weight of the polymer, and one or more co-monomers in a quantity ranging from 1 to 10% by weight with respect to the total weight of the polymer.

The preferred co-monomers are vinyl molecules bearing one or more acid groups such as acrylic acid, methacrylic acid, itaconic acid and the like, preferably itaconic acid. The copolymer can optionally also contain a third co-monomer selected from neutral vinyl molecules such as methyl acrylate, methyl meth-acrylate, vinyl acetate, acrylamide and the like.

The homogeneous spinning solution obtained at the end of the process according to the present invention is free of gel and undissolved residues and can be fed directly to the spinning line (apparatus) or to a storage tank.

The present invention thus allows a solution of acrylonitrile copolymers to be obtained, gel-free and without the formation of insoluble agglomerates, reducing the solvent capacity of the DMSO in the first contact phase between the powdered polymer and the solvent. The formation of a homogeneous suspension (slurry) is thus obtained, which is then transformed into a homogeneous solution, free of gel and undissolved material, by heating the suspension itself. The process according to the present invention therefore allows the two polymerization and spinning steps to be easily integrated.

A good spinning solution free of gels and undissolved material is therefore obtained through a step i) for the preparation of a homogeneous slurry under non-solubility conditions of the polymer and a step ii) for the subsequent rapid heating of the slurry thus obtained. The non-solubility condition of the polymer in DMSO is achieved by adding water to the DMSO, present in the aqueous ammonia or amine solution.

The presence of water has the dual effect of lowering the solidification temperature of the solvent from 18° C. of the pure DMSO to about 0-7° C. in relation to the water content, and significantly decreasing the solubilization characteristics of the mixture thus obtained with respect to the pure DMSO.

The main advantage of the process for preparing the PAN precursors according to the present invention lies in allowing the preparation of a homogeneous suspension of the polymer in the aqueous DMSO solvent. Under these conditions, the solvent is in fact able to penetrate inside each polymer granule without causing its partial dissolution with the consequent formation of a surface film of dope which would prevent a homogeneous imbibition of all the polymeric material.

By rapidly heating the suspension homogeneously impregnated with the solvent, an extremely high-quality dope is obtained, suitable for the preparation of a carbon fiber having a high quality and performance, according to a conventional production technique.

The process according to the present invention, by allowing and even favouring close contact between the solvent and every single polymer particle represents an optimal solution for the homogeneous introduction of ammonium groups on the carboxylic end-groups of the acid co-monomer. This homogeneous salification is particularly simple and efficient thanks to the use of aqueous solutions of ammonia or amines as a co-solvent of the DMSO and allows carbon fibers having a higher quality and performance to be subsequently obtained.

During the preparation of the slurry, under conditions of non-dissolution, the ammonia or amine contained in the solvent used (mixture of DMSO and aqueous solution of ammonia or of a primary or secondary amine) come into close contact with all the carboxyl groups of the polymer thanks to the conditions of homogeneous and complete imbibition of the polymer powder according to the present invention.

By rapidly heating the slurry thus prepared, a spinning dope is obtained wherein all the acid groups are salified with ammonia or primary or secondary amines, a situation comparable to what can be obtained by the diffusion of gaseous ammonia in the dope prepared as described for example in U.S. Pat. Nos. 8,137,810 or 8,674,045.

The advantageous and simplification aspects of the production process of this dope according to the present invention are evident: first of all a neutralized dope is obtained by the use of harmless dilute aqueous solutions of ammonia or amines, without any modification of existing production processes, whereas the use of gaseous ammonia, on the contrary, requires a process phase and specific equipment for this purpose, with the disadvantage of also being a dangerous and toxic reagent.

The present invention also relates to a process for the production of carbon fibers wherein the homogeneous solution obtained as described above is subjected to the following further steps:

iii) spinning the homogeneous solution coming from step ii) and obtaining a tow containing from 500 (0.5 K) to 400,000 (400 K) single filaments, preferably from 1,000 (1K) to 50,000 (50K) single filaments;

iv) feeding the tow coming from phase iii) to the stabilization or oxidation step, said oxidation being carried out for a time ranging from 40 to 120 minutes, at a temperature ranging from 240 to 260° C.;

v) feeding the oxidized tow coming from step iv) to a carbonization step with a maximum temperature of 1,600° C.

The present invention further relates to the homogeneous spinning solution for the production of acrylic fiber precursors of carbon fibers and the carbon fibers obtained with the process according to the present invention.

The stabilization process, also called oxidation, provides for the treatment of the PAN precursor, in the form of a tow containing variable quantities of single filaments in relation to the type of carbon fiber desired. Tows containing from 500 (0.5 K) to 400,000 (400 K) single filaments can be used, tows containing from 1,000 (1K) to 50,000 (50K) single filaments are preferably used. The tow coming from the spinning can be collected on reels or in boxes or caissons from which it can then be easily removed and fed to the stabilization section.

A further advantage of the process according to the present invention is that the acrylic precursors or PAN precursors thus obtained can be stabilized more rapidly and at a lower temperature in the stabilization/oxidation step which precedes the final carbonization step with the production of carbon fiber.

EXAMPLES

By way of non-limiting example of the present invention, some embodiment examples of the process according to the present invention and some comparative examples are provided hereunder.

Example 1 (Reference)

Dissolution of a high-molecular-weight acrylic copolymer (nMW=150,000-180,000) consisting of acrylonitrile (96% by weight with respect to the total weight of the polymer), itaconic acid (1% by weight with respect to the total weight of the polymer) and methyl acrylate (3% by weight with respect to the total weight of the polymer).

The polymer was dispersed in a 95/5 DMSO/Water solution maintained at a temperature of 5° C. until a concentration of polymer in the solvent equal to 17.5% by weight had been reached.

The dissolution of the polymer in the solvent solution was effected in an industrial line for the production of a spinning solution for acrylic polymer. After heating the dispersion by means of a tube bundle exchanger at a temperature of 88° C. for a time of 90 seconds, a homogeneous dope having a viscosity of 350 poises at 60° C. was obtained.

The solvent polymer solution thus obtained was fed to a spinning line for carbon fiber precursors.

During the spinning process, the spinnerets, immersed in a coagulation bath composed of a mixture of water and DMSO, generated a perfectly round, compact, crack-free fiber. The fiber thus obtained was subjected to washing with deionized water to remove the residual solvent, stretched in various passages in boiling water for about 10 times its initial length; dried on hot rollers and collected on reels. The tows obtained are composed of fibers having a diameter of about 12 microns, an average tenacity of 56 cN/Tex and an ultimate elongation of about 17%, measured on an Instron 5542 dynamometer with a 10N cell according to the method ASTM D-3822.

The precursor tow thus obtained was treated in an oxidation oven for 90 minutes with a temperature gradient from 240 to 270° C., finally providing an oxidized fiber of the PANOX type having a density of 1.39 g/cc. The oxidized fiber was subsequently fed to a carbonization section with a maximum temperature of 1,600° C., providing a carbon fiber with a tenacity equal to 4.60 GPa and an elastic modulus equal to 245 MPa.

Example 2

Dissolution of a high-molecular-weight acrylic copolymer (nMW=150,000-180,000) consisting of acrylonitrile (96% by weight with respect to the total weight of the polymer), itaconic acid (1% by weight with respect to the total weight of the polymer) and methyl acrylate (3% by weight with respect to the total weight of the polymer).

The polymer was transformed into dope as described in Example 1, but using a mixture consisting of DMSO (95% by weight) and 5% by weight of an aqueous solution of ammonia at 1.5% by weight as solvent medium, until reaching a concentration of polymer in the solvent equal to 17.5% by weight. The slurry was prepared at a temperature of 5° C. and the spinning dope was obtained by subsequent heating to 88° C., for a time of 90 seconds, obtaining a homogeneous dope having a viscosity of 380 poises at 60° C.

The solvent polymer solution thus obtained was fed to a spinning line for carbon fiber precursors.

During the spinning process, the spinnerets, immersed in a coagulation bath composed of a mixture of water and DMSO, generated a perfectly round, compact, crack-free fiber. The fiber thus obtained was subjected to washing with deionized water to remove the residual solvent, stretched in various passages in boiling water for about 10 times its initial length; dried on hot rollers and collected on reels. The tows obtained are composed of fibers having a diameter of about 12 microns, an average tenacity of 58 cN/Tex and an ultimate elongation of about 18%, measured on an Instron 5542 dynamometer with a 10N cell according to the method ASTM D-3822.

The precursor tow thus obtained was treated in an oxidation oven for 60 minutes with a temperature gradient from 240 to 260° C., finally providing an oxidized fiber of the PANOX type having a density of 1.43 g/cc. The oxidized fiber was subsequently fed to a carbonization section with a maximum temperature of 1,600° C., providing a carbon fiber with a tenacity equal to 5.20 GPa and an elastic modulus equal to 288 MPa.

Example 3

Dissolution of a high-molecular-weight acrylic copolymer (nMW=180,000-200,000) consisting of acrylonitrile (97% by weight with respect to the total weight of the polymer), and itaconic acid (3% by weight with respect to the total weight of the polymer)

The polymer was transformed into dope as described in Example 1, but using as solvent medium a mixture consisting of DMSO (94% by weight) and 6% by weight of a 3% aqueous ammonia solution until a concentration of polymer in the solvent equal to 17.5% by weight had been reached. The slurry was prepared at a temperature of 4° C. and the spinning dope was obtained by heating to 88° C. for a time of 90 seconds, obtaining a homogeneous dope having a viscosity of 450 poises at 60° C.

The solvent polymer solution thus obtained was fed to a spinning line for carbon fiber precursors.

During the spinning process, the spinnerets, immersed in a coagulation bath composed of a mixture of water and DMSO, generated a perfectly round, compact, crack-free fiber. The fiber thus obtained was subjected to washing with deionized water to remove the residual solvent, stretched in various passages in boiling water for about 10 times its initial length; dried on hot rollers and collected on reels. The tows obtained are composed of fibers having a diameter of about 12 microns, an average tenacity of 65 cN/Tex and an ultimate elongation of about 16%, measured on an Instron 5542 dynamometer with a 10N cell according to the method ASTM D-3822.

The precursor tow thus obtained was treated in an oxidation oven for 40 minutes with a temperature gradient from 240 to 260° C., finally providing an oxidized fiber of the PANOX type having a density of 1.40 g/cc. The oxidized fiber was subsequently fed to a carbonization section with a maximum temperature of 1,600° C. providing a carbon fiber with a tenacity equal to 5.34 GPa and an elastic modulus equal to 295 MPa.

Example 4

Dissolution of a high-molecular-weight acrylic copolymer (nMW=150,000-180,000) consisting of acrylonitrile (96% by weight with respect to the total weight of the polymer), itaconic acid (1% by weight with respect to the total weight of the polymer) and methyl acrylate (3% by weight with respect to the total weight of the polymer).

The polymer was transformed into dope as described in Example 1, but using as solvent medium a mixture consisting of DMSO (95% by weight) and 5% by weight of an aqueous solution of methylamine at 3.5% by weight, until a concentration of polymer in the solvent equal to 17.5% by weight had been reached. The slurry was prepared at a temperature of 5° C. and the spinning dope was obtained by subsequent heating to 88° C., for a time of 90 seconds, obtaining a homogeneous dope having a viscosity of 380 poises at 60° C.

The solvent polymer solution thus obtained was fed to a spinning line for carbon fiber precursors.

During the spinning process, the spinnerets, immersed in a coagulation bath composed of a mixture of water and DMSO, generated a perfectly round, compact, crack-free fiber. The fiber thus obtained was subjected to washing with deionized water to remove the residual solvent, stretched in various passages in boiling water for about 10 times its initial length; dried on hot rollers and collected on reels. The tows obtained are composed of fibers having a diameter of about 12 microns, an average tenacity of 61 cN/Tex and an ultimate elongation of about 16%, measured on an Instron 5542 dynamometer with a 10N cell according to the method ASTM D-3822.

The precursor tow thus obtained was treated in an oxidation oven for 60 minutes with a temperature gradient from 240 to 260° C., finally providing an oxidized fiber of the PANOX type having a density of 1.41 g/cc. The oxidized fiber was subsequently fed to a carbonization section with a maximum temperature of 1,600° C., providing a carbon fiber with a tenacity equal to 5.12 GPa and an elastic modulus equal to 278 MPa.

The invention claimed is:

1. A process for the production of carbon fibers comprising the steps of:
   i) preparing a homogeneous suspension by mixing an acrylonitrile copolymer in powder form with a solvent consisting of a mixture containing DMSO in a quantity ranging from 90 to 99% by weight and an aqueous solution of ammonia and/or one or more primary amines selected from the group consisting of methylamine, ethylamine and isopropylamine, and/or one or more secondary amines selected from the group consisting of consisting of dimethylamine, diethylamine and diisopropylamine, in a quantity ranging from 1 to 10% by weight with respect to the total weight of the solvent, at a temperature ranging from 5° C. to 10° C., said mixing being carried out for a time ranging from 5 to 30 minutes, by spraying a stream of the DMSO solvent/aqueous ammonia solution and/or a primary or secondary amine, onto a stream of disintegrated and premixed acrylonitrile copolymer powder;
   ii) heating the homogeneous suspension coming from step i) to a temperature ranging from 70 to 150° C. for a time ranging from 0.5 to 30 minutes, until the complete dissolution of the copolymer and the formation of a homogeneous solution;
   iii) spinning the homogeneous solution coming from step ii) and obtaining a tow containing from 500 (0.5 K) to 400,000 (400 K) single filaments;
   iv) feeding the tow coming from step iii) to a stabilization or oxidation step, said oxidation being carried out for a time ranging from 40 to 120 minutes, at a temperature ranging from 240 to 260° C.;

v) feeding the oxidized tow coming from step iv) to a carbonization step with a maximum temperature of 1,600° C.

2. The process according to claim 1, wherein the aqueous solution of ammonia or a primary amine or a secondary amine comprises from 1 to 10% by weight of the nitrogenated substance with respect to the total weight of the solution.

3. The process according to claim 1, wherein the solvent consists of a mixture containing DMSO and an aqueous ammonia solution.

4. The process according to claim 1, wherein the copolymer is a high-molecular-weight copolymer, ranging from 100,000 to 300,000 Da, composed of acrylonitrile, in a quantity ranging from 90 to 99% by weight with respect to the total weight of the polymer, and one or more co-monomers in a quantity ranging from 1 to 10% by weight with respect to the total weight of the polymer.

5. The process according to claim 4, wherein the co-monomers are vinyl molecules carrying one or more acid groups selected from the group consisting of acrylic acid, methacrylic acid, and itaconic acid.

6. The process according to claim 1, wherein the copolymer also comprises a third co-monomer comprising neutral vinyl molecules.

7. The process according to claim 1, wherein the solvent comprises of a mixture containing DMSO in a quantity ranging from 93 to 98% by weight and an aqueous solution of ammonia and/or one or more primary amines and/or one or more secondary amines in a quantity ranging from 2 to 7% with respect to the total weight of the solvent, at a temperature of 5° C.

8. The process according to claim 1, wherein the solvent comprises of a mixture containing DMSO in a quantity ranging from 93 to 96% by weight and an aqueous solution of ammonia and/or one or more primary amines and/or one or more secondary amines in a quantity ranging from 4 to 7%, by weight with respect to the total weight of the solvent, at a temperature of 5° C.

9. The process according to claim 2, wherein the aqueous solution of ammonia or a primary amine or a secondary amine comprises from 2 to 7% by weight of the nitrogenated substance with respect to the total weight of the solution.

10. The process according to claim 5, wherein the co-monomers are vinyl molecules carrying one an acid group comprising itaconic acid.

11. The process according to claim 6, wherein the third co-monomer is selected from the group consisting of methyl acrylate, methyl methacrylate, vinyl acetate, and acrylamide.

12. The process according to claim 1, wherein the tow of step iii) contains from 1,000 (1K) to 50,000 (50K) single filaments.

* * * * *